United States Patent

[11] 3,607,079

[72] Inventors Theodore Maxon
Elmhurst;
Lowell A. Kleiman, Roslyn, both of N.Y.
[21] Appl. No. 829,562
[22] Filed June 2, 1969
[45] Patented Sept. 21, 1971
[73] Assignee Scientific Industries, Inc.
Hempstead, N.Y.

[54] ANALYSIS ARRANGEMENT FOR CHEMICAL ANALYZING APPARATUS
23 Claims, 3 Drawing Figs.
[52] U.S. Cl........................................ 23/230 R,
23/253 R, 23/253 TP, 23/259
[51] Int. Cl........................................ G01n 1/00,
G01n 1/28, G01n 21/00
[50] Field of Search............................23/253, 253
TP, 253 A, 259, 230 A, 230

[56] References Cited
UNITED STATES PATENTS
| | | | |
|---|---|---|---|
| 3,036,893 | 5/1962 | Natelson........................ | 23/253 X |
| 3,036,894 | 5/1962 | Forestiere.................... | 23/259 X |
| 3,502,438 | 3/1970 | Natelson........................ | 23/253 |
| 3,508,879 | 4/1970 | Findl et al.................... | 23/259 |

*Primary Examiner*—Morris O. Wolk
*Assistant Examiner*—R. E. Serwin
*Attorney*—Ostrolenk, Faber, Gerb & Soffen

ABSTRACT: For use in a chemical-analyzing apparatus, a liquid sample analysis arrangement, comprising a liquid sample receiving, holding and transferring strip medium comprising an elongated tape having a plurality of spaced, uniformly dimensioned, liquid sample absorbing locations on one face thereof; and an analyzing strip medium comprising an elongated tape to which sample from the absorbent locations is transferred, and which analyzing medium has reagent applied to it to react with the transferred liquid sample; the analyzing apparatus comprising means for feeding and taking up the above noted strip mediums, means for dispensing liquid sample to the receiving medium, means for causing the transfer of liquid sample from the receiving to the analyzing medium and means for cooperating with the analyzing medium for analyzing the reaction between the reagent and the liquid sample. Alternatively, reagent can be caused to travel to the strip medium which has previously received liquid sample, instead of in the reverse direction and reaction on and analysis of this sample receiving medium will be performed.

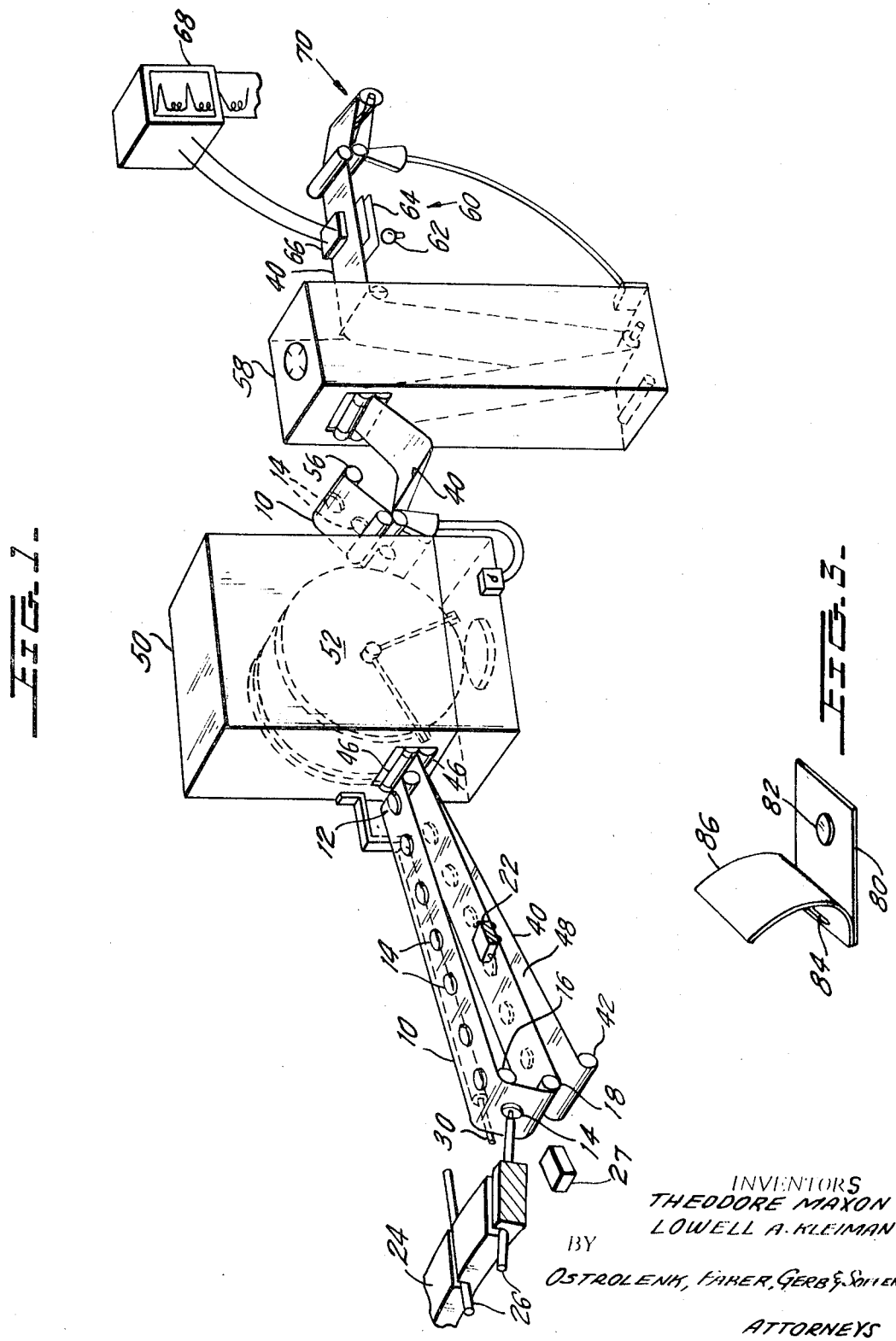

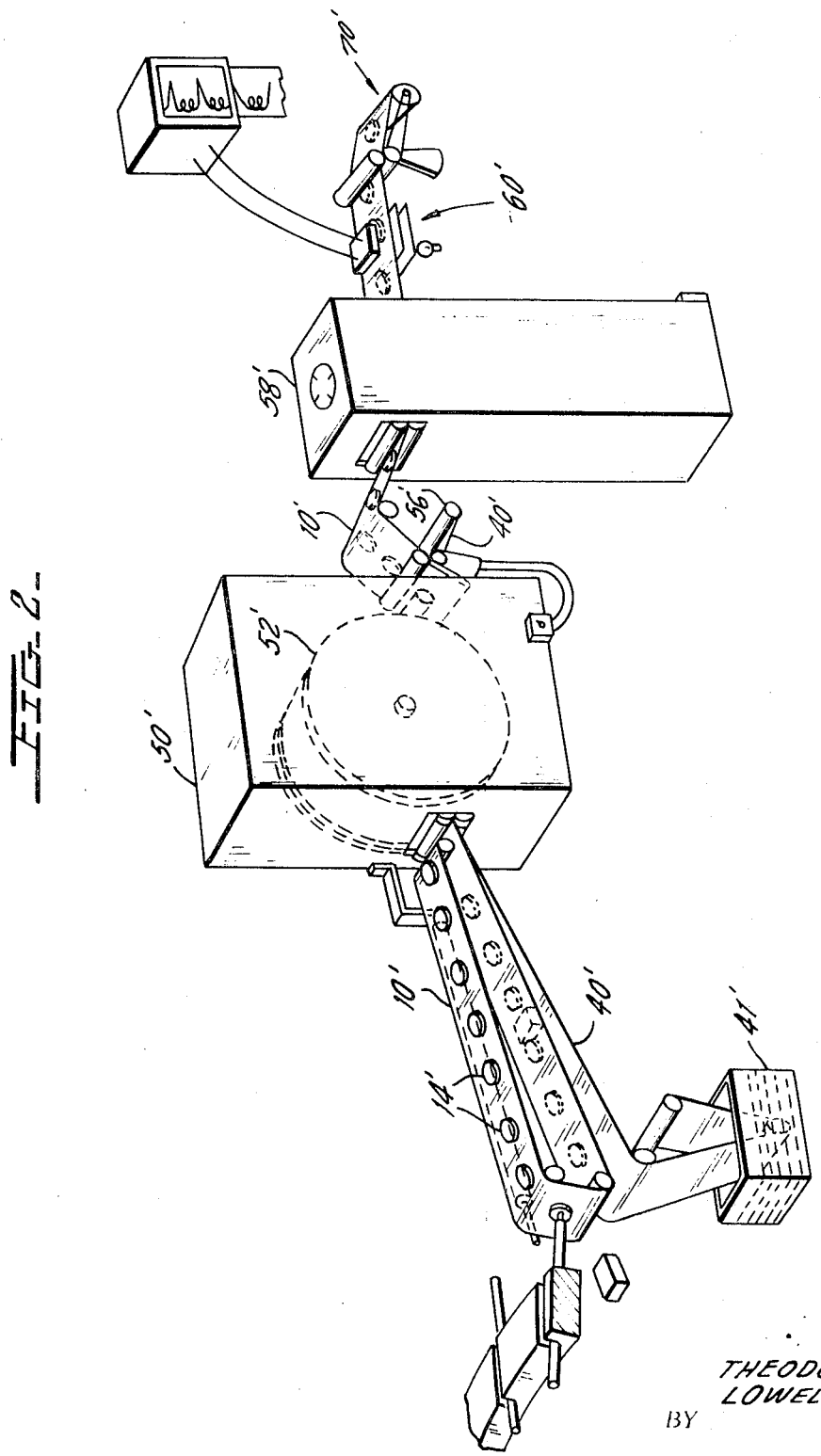

ANALYSIS ARRANGEMENT FOR CHEMICAL ANALYZING APPARATUS

This invention relates to an improved analysis arrangement for chemical analysis and more particularly to such an arrangement for use in conjunction with a liquid sample chemical analyzing apparatus.

In chemical laboratories quite often a large number of individual liquid samples must be analyzed rapidly. Multiple analyses are time consuming and often tedious to an operator. This results in frequent human errors due to the large number of samples being analyzed and to the close attention which must be paid by an operator during each step of the procedure. Also, there are limitations as to the speed at which an operator can analyze each sample individually.

To ameliorate this situation, apparatus have been introduced which remove a quantity of the sample to be analyzed, add reagents to it, and perform a complex procedure, requiring elaborate instrumentation, to automatically analyze the sample. These known devices are quite expensive to produce, are cumbersome to set up, and require great skill on the part of an operator in setting the instrument up and adjusting it during operation. These devices also require appreciable quantities of sample material for analysis and, therefore, do not readily lend themselves to analysis of minute samples, e.g. of the order of microliters.

A greatly simplified analyzing apparatus has been designed, which is simpler in construction and much easier to operate and which is capable of rapidly analyzing minute liquid samples with a minimum of human participation in the analysis procedure, thereby reducing the problems of human error. See, U.S. Pat. No. 3,036,893, issued on May 29, 1962 to Samuel Natelson, entitled "Automatic Chemical Analyzer," and assigned to the assignee hereof. The liquid samples to be analyzed are each placed in a capillary tube having a very narrow opening, whereby a small quantity of sample is required to fill each tube. The sample is dispensed to an elongated receiving tape. The sample receiving tape is superimposed over a tape of porous medium which is, in turn, superimposed over an analyzing tape. The three tapes are squeezed together. The liquid sample on the sample-receiving tape is uniformly diffused through the porous medium because the pores of this porous medium pass the liquid sample at only a relatively slow rate. The sample is filtered by the porous medium so that the larger particles, e.g. certain proteins and larger molecules, are filtered out of the sample. The evenly distributed and partially filtered sample which passed to the analysis tape reacts with a reagent that is applied to that tape. After a reaction between the reagent and the liquid sample takes place, the analysis tape is transferred to an analyzing apparatus which analyzes the reaction, and thereby analyzes the contents of the liquid sample.

The three tape mediums used in conjunction with the above described chemical analyzer are separately described in U.S. Pat. No. 3,261,668, issued on July 19, 1966 to Samuel Netelson, entitled "Chemical Analyzer Tape," and assigned to the assignee hereof.

As the techniques of dispensing liquid samples to the apparatus of aforementioned U.S. Pat. No. 3,036,893 have improved, it has become apparent that in certain applications, the provision of an initial sample-receiving tape to which the sample is dispensed is not required. Sample-dispensing techniques have advanced to such a stage that the sample can be deposited directly on the porous medium, which both diffuses the sample uniformly over the analysis medium as the sample passes through its pores and filters the larger molecules and particles out of the liquid sample. This modified chemical analyzer is shown in U.S. Pat. No. 3,368,872, issued Feb. 13, 1968 to Samuel Netelson, entitled "Automatic Chemical Analyzer," and assigned to the assignee hereof.

It is significant that in all of the above systems, the porous medium is required for uniformly distributing liquid sample onto the analysis medium. All of the above systems, however, have a number of drawbacks which the present invention is designed to overcome. The pores of the porous medium, being small, necessarily prevent the passage of part of the sample. In the event that some of the chemical components to be analyzed are also contained in the larger particles which are filtered out, the analysis results will not be complete. Furthermore, the small pores restrict the volume of the sample that can be transferred during a predetermined time period. Thus, the transfer of sample from the medium that receives the sample to the analyzing medium will necessarily take longer than if there were no porous medium. Also, since the pores restrict flow, a greater pressure must be applied to force the required amount of sample through the porous medium than if there were no such medium.

The present invention provides an improvement over the above described chemical-analyzing apparatus. In a preferred form of the present invention, there is provided an improved analysis arrangement, comprising a sample receiving, holding and transferring strip medium which receives the sample to be analyzed from the dispensing means, and an analyzing strip medium, upon which the sample-receiving medium is superimposed after it receives sample. Means then bring about the transfer of sample from the receiving medium to the analyzing medium. Reaction between the transferred sample and reagent on the analyzing medium takes place and the reaction is then analyzed.

With this preferred sample transfer apparatus the sample-receiving medium includes at least one, and usually a plurality, of sample-receiving absorbent locations. Liquid sample is dispensed to each of these absorbent locations and, due to normal capillary action, the sample is uniformly dispersed throughout the absorbent location. Transfer to the analyzing medium from these locations is obtained through squeezing the locations and the analyzing medium together. Since sample is uniformly dispersed on each absorbent location, when the absorbent locations and the analyzing medium are squeezed together, the already uniformly distributed sample is transferred in a uniform patch to the analyzing medium. Thus, no undesirable concentration of liquid sample develops at the immediate spot to which the sample had been dispensed to the receiving medium.

While one form of the present invention contemplates the transfer of sample from the sample-receiving strip medium to the reagent receiving and holding analysis medium, it is within the contemplation of the invention to have sample transferred to and remain on the sample-receiving medium and to have reagent, which has been applied to the other strip medium, transferred to the sample-receiving medium so that the reaction to be measured takes place on the latter medium. The obstacles to efficient sample transfer discussed above, which were overcome by the elimination of the porous medium, also are eliminated for reagent transfer in accordance with the first described procedure.

The arrangement of the present invention overcomes the drawbacks of the prior art. Where the porous medium is eliminated, it is obviously cheaper to manufacture the analysis arrangement since one of the strip mediums has been eliminated entirely. A greater volume of the liquid sample that was dispensed to the receiving medium is transferred to the analyzing medium with an arrangement where there is no small pore dialysis medium interposed to block the transfer. Sample travels much more rapidly between the receiving and the analyzing medium because the distance to be traversed is shorter and there are no pores to restrict the transfer speed. Since more of the sample dispensed can be transferred to the analyzing medium per unit time, the reaction on the analyzing tape will be more intense and, therefore, more readily measured. Comparisons among reactions between the reagent and each successive sample are easier where the reaction is more intense. In addition, since there are no longer small pores blocking sample transfer, the squeezing pressure required to transfer sample from the absorbent locations to the analyzing medium is much less, thereby simplifying the apparatus required to bring about sample transfer.

A system employing a porous tape medium is intended to perform only tests requiring filtration, which necessarily filters certain large molecules and particles out of a liquid sample. However, there are many other tests that can be performed on a liquid sample where it is not necessary to filter out some molecules or particles. Furthermore, in some reactions, it is desirable to have the entire sample transferred without filtering any substances out of it. Therefore, the systems employing a porous medium were designed for a different purpose than the improved analysis arrangement of the present invention.

Accordingly, it is a primary object of the present invention to provide an improved analysis arrangement for use in conjunction with a chemical analyzing apparatus.

It is another object of the present invention to provide an improved analysis arrangement for rapidly and simply analyzing a plurality of liquid samples in sequence.

It is another object of the present invention to provide an analysis arrangement which permits sample to be rapidly transferred from a sample-receiving strip medium to a sample-analyzing medium so that a reaction takes place on the latter medium.

It is a further object of the present invention to provide an analysis arrangement which permits reagent to be rapidly transferred from a strip medium carrying the reagent to the sample receiving medium so that a reaction takes place on the latter medium.

It is another object of the present invention to provide an analysis arrangement which permits sample to be rapidly transferred between strip mediums without excessive squeezing pressures having to be applied to bring about the transfer.

It is another object of the present invention to provide an improved analysis arrangement which sequentially receives a plurality of samples, and which distributes each sample uniformly over a location on an analyzing medium, so that analysis can be performed on uniformly distributed samples on the analyzing medium.

It is another object of the present invention to cause the reaction between liquid sample and reagent which reacts with the sample to be intense.

It is another object of the present invention to provide an improved analysis arrangement having a sample-analyzing strip medium, but which has no need for a porous medium for diffusing sample deposited on the analysis medium or for filtering larger particles and proteins out of the sample.

It is a further object of the present invention to provide an analysis arrangement which uses only both a sample-receiving strip medium and a sample-analyzing strip medium.

These and other objects of the present invention will become apparent when the following description is read in conjunction with the accompanying drawings in which:

FIG. 1 shows one form of improved analysis arrangement designed in accordance with the present invention, being used in conjunction with a chemical-analyzing apparatus;

FIG. 2 is a schematic view of a modified form of analysis arrangement designed in accordance with the invention; and FIG. 3 illustrates an alternate form of improved analysis arrangement designed in accordance with the present invention.

Referring to FIG. 1, the sample receiving, holding and transferring medium 10 comprises an elongated, flexible, nonabsorbent, inert tape, formed of plastic, for example, which is unwound from fixedly positioned payoff reel 12. Tape 10 has a plurality of spaced-apart, absorbent locations 14 thereon for receiving and holding liquid sample dispensed by a dispensing apparatus to be described below. Preferably, the absorbent locations are each adapted to hold a uniform volume of liquid sample. The design of such absorbent locations is considered in greater detail in U.S. application Ser. No. 726,652, filed May 6, 1968 by Theodore Maxon, entitled "Method for Obtaining a Known Volume of Liquid and Absorption Apparatus Therefor," and assigned to the assignee hereof.

All of the locations 14 may be comprised of absorbent pads. Each pad is formed of the same material, or of material having identical absorption characteristics, viz the ability to absorb, until saturated, a predetermined quantity of liquid per unit volume of absorbent pad material. Each pad may have identical dimensions, especially the surface area of the outside face of the absorbent pad 14. When all the pads 14 are uniform, if liquid sample is applied to each of them until each is saturated, since all pads have a uniform absorption characteristic, each pad will be holding a uniform predictable volume of liquid sample. The pads are at regularly spaced intervals on tape 10 so that the sample on one pad will not mingle with the sample on another.

Tape 10 passes over spools 16 and 18. Each time a pad 14 arrives at the receiving location between spools 16 and 18, tape 10 temporarily halts and liquid sample is dispensed to that pad.

A preferred form of dispensing apparatus for dispensing liquid sample is shown in U.S. Pat. application Ser. No. 751,816, filed Aug. 12, 1968, by Robert Davis, Theodore Shlisky, John Silverman and William Pipa, entitled "Apparatus for Dispensing Liquid Sample," and assigned to the assignee hereof. Briefly, an optical sensing apparatus 22 senses when a pad 14 has arrived at the receiving location and sends a signal which temporarily halts the movement of tape 10.

Simultaneously with the movement of the tape, a sample receptacle support plate 24, comprising a rotatable disc, is rotating the next sample holding capillary 26 into the dispensing position to have its contents dispensed to the absorbent pad 14 at the receiving location. A sensing device 27 senses when the next capillary 26 is in the dispensing position and sends a signal which temporarily halts plate 24.

When both the tape 10 and plate 24 have halted, a solenoid device 30 is operated to shift the portion of the tape 10 between spools 16 and 18 so that the absorbent pad 14 at the receiving location is shifted to a sample transfer position in the immediate vicinity of, or in contact with, the outer end of the capillary 26 at the dispensing position. If the absorbent pad contacts the end of the capillary tube, sample may be drawn out of the capillary by capillary action. Alternatively, the liquid sample may be blown or otherwise forced out of the capillary tube onto the pad.

After the desired volume of sample has been transferred to the pad 14, the solenoid device 30 reshifts the portion of tape 10 between spools 16 and 18 to the inoperative position and both the tape 10 and the plate 24 again rotate to position the next pad 14 and capillary 26, respectively, so that the next dispensing operation can take place.

The above described apparatus employs a timing device for coordinating the action just described.

When tape 10 first unwinds from reel 12, absorbent locations 14 are facing outward to enable them to receive sample being dispensed. Once locations 14 have received sample and move around spool 18, they are facing inward with respect to the next described analyzing strip medium 40, and are, therefore, shown in dotted line form since they are hidden.

Analyzing strip medium 40 also comprises an elongated, flexible, inert tape. It unwinds from payoff reel 42. At the option of the designer of the system, tape 40 may be impregnated, prior to being mounted on the apparatus of FIG. 1, with the reagent for reacting with the sample which is transferred to tape 40 by means to be described. Alternatively, tape 40 may be treated with reagent while it is on the instrument, but before sample is transferred to it. Or, reagent may be applied after the sample has been transferred. The material of which the analyzing medium tape is formed might be absorbent cloth, absorbent paper or other absorbent material. Alternatively, this tape might be formed of a nonabsorbent material, such as a plastic. If the analyzing medium is formed of absorbent material, it can be impregnated in advance with reagent or it can absorb reagent later. If the medium is nonabsorbent, it can be coated with reagent, either in advance of or after sample is transferred to it.

Both of the receiving medium and the analyzing medium, i.e., tapes 10 and 40, move toward the compression rollers 46. As the two tapes are brought together by these rollers, the absorbent locations 14 are brought into direct contact with the facing surface 48 of the analysis medium.

Once tapes 10 and 40 pass compression rollers 46, they move together into transfer zone 50 where they are pressed together by being drawn tight over drum 52. Rollers 46 and drum 52 combine to form a superimposing means for superimposing tapes 10 and 40. Each pad 14 is squeezed by the pressure, and the sample thereon is gradually squeezed out of the pad and transferred to the surface 48 of analysis tape 40. Pressure on each pad is uniform. Other superimposing means may be used, such as a press that squeezes the tapes together, each time they halt their forward progress, with a predetermined pressure. If each pad is identical and holds an identical quantity of sample, an identical and predictable volume of sample is squeezed from each pad 14 to form a uniform patch of sample on analysis tape 40.

Both tapes exit from the transfer zone 50, and tape 10 then is taken up on takeup reel 56. The analysis tape 40 passes into the treatment zone 58 where the tape may be treated with a reagent, if it has not already been so treated, or the tape may be washed, heated, dried or otherwise treated to bring about the desired reaction between the liquid sample being tested and the reagent on the tape.

In a modified version of the analysis arrangement shown in FIG. 2 the tape medium 40' is supplied, in advance of the passage of the tapes through the transfer zone 50', with reagent when tape 40' passes through bath 41'. The tape 40' is comprised of material from which reagent may be transferred, e.g. absorbent material which gives up liquid when pressure is applied to it. It is also within the contemplation of the invention for tape 40' to have been pretreated with transferable reagent and to have been stored in a manner which would preclude reagent being prematurely transferred from this tape. The sample-receiving locations 14' on the sample receiving and holding tape medium 10' would cooperatingly be made of material, which would not transfer the sample which had been dispensed to it, to the reagent-holding medium 49'. Passage of the tapes 10' and 40' through the transfer zone 50' over drum 52' would bring about transfer of reagent to the sample-receiving tape 10' and the reaction to be measured, between sample and reagent, would take place on the latter tape.

With this arrangement, it is the tape 10', on which the sample and reagent have mixed and on which the reaction has taken place that passes through the treatment zone 58' and is eventually analyzed. The reagent holding and supplying tape 40' is taken up on a takeup reel 56'. Tape 10', on which the sample-reagent reaction is to occur, enters the treatment zone 58', where operations like those described above for the first form of the invention are performed upon it. The reaction which has occurred on that tape is analyzed in means 60'.

The treated tape, whether it be 40 or 10', next moves to a reading zone 60 where, for example, a light 62 is shined through a filter 64 and through the tape. The resulting light is sensed by a sensing means 66 which sends a signal to recording means 68 that records the signal. The light signal transmitted to sensing means 66 will vary depending upon the type of reaction and the extent of the reaction occurring between the reagent and the sample tested. After the treated tape has been read, it moves to the tape takeup zone 70 where it is would up.

The foregoing describes the analysis arrangement of the present invention, which comprises a receiving strip medium for receiving liquid sample dispensed from a dispensing device, and an analysis strip medium on which the receiving medium is superimposed after the latter receives the sample. The receiving strip medium includes spaced absorbent locations, each of which uniformly distributes liquid sample over itself. The liquid sample in each absorbent location is squeezed out of same and is transferred to the portion of the analyzing medium which is in direct engagement with the absorbent location. Alternatively, reagent travels from the analyzing medium to the receiving medium.

The present invention has been described in conjunction with a sample receiving, holding and transferring strip medium comprising an elongated tape having absorbent locations thereon, and also in conjunction with an analyzing strip medium comprising an elongated tape for receiving sample transferred to it. However, as shown in FIG. 3, neither of these mediums need comprise an elongated tape. In FIG. 3, the receiving holding and transferring medium comprises a leaf 80 which supports an absorbent location 82 positioned thereon. The absorbent location may, like absorbent location 14, be an absorbent pad, having the qualities of the absorbent pads described above. Attached to leaf 80 by securing means 84 is analyzing medium leaf 86 which comprises a short strip of reagent-impregnated absorbent material.

The improved analysis arrangement shown in FIG. 3 is especially adaptable for analyses performed in the field, where access to a chemical analyzer, such as that shown in FIG. 1 is difficult. A doctor in his office, for example, might have a supply of the analysis arrangements of FIG. 3 and might perform analyses in his office. The doctor or other operator applies liquid sample to absorbent location 82 until the location becomes saturated and then uses finger pressure to squeeze the analyzing medium 86 against the pad 82, which causes a transfer of the sample on pad 82 to the analysis medium 86. Pad 82 has the liquid sample on it uniformly distributed so that the liquid sample transferred from pad 82 to the analyzing medium leaf 86 is uniformly spread over the portion of medium 86 to which the sample is transferred.

It is to be understood that as with the modified version of analysis arrangement shown in FIG. 2, the FIG. 3 arrangement may be modified so that reagent travels from leaf 86 to pad 82.

The operator in the field then analyzes the reaction between the liquid sample and the reagent. For example, the reaction might produce a particular color. The quality of the color or its intensity would depend upon the qualities of the liquid sample. The operator has a color comparison chart with which he compares the color of the reaction with control colors to determine what the reaction shows or he has a special photoelectric reader for this purpose. Alternatively, the mere presence of a particular color might serve as a warning that the liquid sample contains a particular component. For example, if the presence of a particular acidity level in a sample were to be determined, the analysis medium could be impregnated with a color-responsive acid-level-measuring substance, e.g. litmus paper, and also could be impregnated with a predetermined concentration of alkaline material. Once the level of acidity in the sample on absorbent location 82 exceeds the alkalinity of analyzing medium 86, the color of the analyzing medium will change, thereby indicating a predetermined level of acidity. Other uses for the improved analysis arrangement of the present invention can be envisioned by those skilled in the art.

Although the invention has been described above with respect to its preferred embodiments, it will be understood that many variations and modifications will be obvious to those skilled in the art. It is preferred, therefore, that the scope of the invention be limited not by the specific disclosure herein but only by the appended claims.

We claim:

1. A system for chemical analysis, comprising two strip mediums, one of which is a liquid sample receiving, holding and transferring medium and the other of which is a liquid-sample-analyzing medium; each said medium having a face which is adapted to be superimposed directly into contact with the said face of the other medium;

said receiving medium being adapted to receive, from a dispensing device, and to hold liquid sample to be analyzed; and also being adapted to transfer said sample to said analyzing medium;

said analyzing medium being adapted to receive the sample transferred to it and to have the sample analyzed thereon.

2. The system for chemical analysis of claim 1, wherein said receiving medium comprises a strip which includes a plurality of spaced-apart locations adapted to receive and hold sample and which are adapted to release the sample, thereby to transfer the sample to said analyzing medium; said analyzing medium also comprising a strip.

3. In combination, the system for chemical analysis of claim 2, and a chemical-analyzing apparatus;
said chemical-analyzing apparatus comprising, means for holding and supplying each of said strip mediums; means for dispensing liquid sample to said receiving medium; superimposing means moving into contact with both said strip mediums after liquid sample has been applied to said receiving medium for superimposing said mediums, thereby to bring about transfer of sample from said receiving medium to said analyzing medium;
analyzing means cooperating with said analyzing medium after transfer of sample to said analyzing medium has occurred and after a reaction between the transferred sample and the reagent on said analyzing medium has occurred to analyze the reaction.

4. The system for chemical analysis of claim 1, wherein said receiving medium includes at least one absorbent portion, which absorbent portion is adapted to receive and hold liquid sample and to be squeezed to release the sample from said absorbent portion, thereby to transfer the sample to said analyzing medium.

5. The system for chemical analysis of claim 4, wherein said analyzing medium is adapted to receive a reagent which reacts with the liquid sample transferred to said analyzing medium, thereby to analyze said sample.

6. The system for chemical analysis of claim 5, wherein said receiving medium comprises a strip on said face of which is positioned a plurality of spaced apart absorbent locations for serving as the sample receiving and holding portion of said receiving medium.

7. The system for chemical analysis of claim 6, wherein said absorbent locations each are adapted to receive and hold a uniform volume of liquid sample;
each of said locations having its own said face which is adapted to be superimposed on said face of said analysis medium; each said face of said locations having uniform dimensions,
whereby a uniform volume of sample may be transferred by and uniformly spread over said analysis medium by each said location.

8. In combination, the system for chemical analysis of claim 6, and a chemical analyzing apparatus;
said chemical-analyzing apparatus comprising, means for holding and supplying each of said strip mediums; means for dispensing liquid sample to said receiving medium; superimposing means moving into contact with both said strip mediums after liquid sample has been applied to said receiving medium for superimposing said mediums, thereby to bring about transfer of sample from said receiving medium to said analyzing medium;
analyzing means cooperating with said analyzing medium after transfer of sample to said analyzing medium has occurred and after a reaction between the transferred sample and the reagent on said analyzing medium has occurred to analyze the reaction.

9. The combination of claim 8, wherein said superimposing means squeezes said analyzing and said receiving mediums together to bring about sample transfer.

10. The combination of claim 8, wherein said absorbent locations each are adapted to receive and hold a uniform volume of liquid sample;
each of said locations having its own said face which is adapted to be superimposed on said face of said analysis medium; each said face of said locations having uniform dimensions,
whereby a uniform volume of sample may be transferred by and uniformly spread over said analysis medium by each said location.

11. A system for chemical analysis comprising two strip mediums, one of which is a liquid sample receiving and holding medium, and the other of which is a reagent receiving and holding medium, the latter being for holding reagent which reacts with the liquid sample to produce an analyzable reaction; each said strip medium having a face which is adapted to be superimposed directly into contact with the said face of the other strip medium;
said sample-receiving medium being adapted to receive, from a dispensing device, and to hold liquid sample to be analyzed; said reagent-receiving medium being adapted to receive and to hold reagent to be reacted with the liquid sample;
one of said sample-receiving and said reagent-receiving mediums being adapted to transfer its contents to the other said medium, whereby the reaction between sample and reagent takes place on that other said medium.

12. The system for chemical analysis of claim 11, wherein said reagent-receiving medium is comprised of material which has the capacity to transfer its reagent contents to said sample-receiving medium.

13. The system for chemical analysis of claim 12, wherein said sample-receiving medium comprises a strip which includes a plurality of spaced apart locations, each adapted to receive and hold liquid sample and to which the reagent on said reagent receiving and holding medium is transferred; said reagent-receiving medium also comprises a strip.

14. In combination, the system for chemical analysis of claim 13, and a chemical analyzing apparatus;
said chemical-analyzing apparatus comprising, means for holding and supplying each of said strip mediums; means for dispensing liquid sample to said sample-receiving medium; superimposing means moving into contact with both said strip mediums after liquid sample has been applied to said liquid-sample-receiving mediums for superimposing said mediums, thereby to bring about transfer of reagent from said reagent holding to said sample holding medium;
analyzing means cooperating with said sample-receiving medium, after reagent transfer has occurred and after a reaction between the transferred reagent and the sample has occurred, to analyze the reaction.

15. A method for chemical analysis comprising the steps of
applying liquid sample to be analyzed onto the face of one strip medium;
applying reagent to be reacted with the liquid sample onto the face of another strip medium;
superimposing the two strip medium faces directly into contact with each other;
next, transferring either of the liquid sample and the reagent to the other strip medium, thereby causing a reaction between sample and reagent; and
analyzing the resulting sample-reagent reaction.

16. The method for chemical analysis of claim 15, wherein said transferring step is performed by squeezing the two strip medium faces together.

17. The method for chemical analysis of claim 15, wherein the transferring step consists of transferring the reagent to the liquid-sample-holding medium.

18. The method for chemical analysis of claim 15, wherein the transferring step consists of transferring the liquid sample to the reagent-holding strip medium.

19. The method for chemical analysis of claim 18, wherein the reagent is applied to the reagent-holding strip medium after sample has been transferred to the reagent-holding strip medium.

20. A method for chemically analyzing a plurality of liquid samples comprising the steps of
applying each liquid sample to the face of a single strip medium, each sample being spaced apart from the others on the one strip medium;
applying reagent to be reacted with the liquid sample on the face of another strip medium;

superimposing the two strip medium faces directly into contact with each other so that the faces of the reagent holding strip medium contacts all of the liquid samples;

next, transferring either of the liquid samples and the reagent to the other strip medium, thereby causing a reaction between reagent and every sample;

analyzing every sample-reagent reaction.

21. The method for chemical analysis of claim 20, wherein said transferring step is performed by squeezing the two strip medium faces together.

22. The method for chemical analysis of claim 20, wherein the transferring step consists of transferring the liquid sample from the liquid-sample-holding strip medium to the reagent-holding strip medium.

23. The method for chemical analysis of claim 20, wherein after each sample is applied to the face of a strip medium, it is spread over a larger area of the strip medium to enlarge the area of the reaction.